United States Patent
Yasui et al.

(10) Patent No.: US 11,860,627 B2
(45) Date of Patent: Jan. 2, 2024

(54) IMAGE PROCESSING APPARATUS, VEHICLE, CONTROL METHOD FOR INFORMATION PROCESSING APPARATUS, STORAGE MEDIUM, INFORMATION PROCESSING SERVER, AND INFORMATION PROCESSING METHOD FOR RECOGNIZING A TARGET WITHIN A CAPTURED IMAGE

(71) Applicant: HONDA MOTOR CO., LTD., Tokyo (JP)

(72) Inventors: Yuji Yasui, Wako (JP); Tokitomo Ariyoshi, Wako (JP); Hideki Matsunaga, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 356 days.

(21) Appl. No.: 17/143,521

(22) Filed: Jan. 7, 2021

(65) Prior Publication Data

US 2021/0224554 A1    Jul. 22, 2021

(30) Foreign Application Priority Data

Jan. 16, 2020    (JP) ................. 2020-005391

(51) Int. Cl.
| | |
|---|---|
| G06T 11/00 | (2006.01) |
| G05D 1/00 | (2006.01) |
| G05D 1/02 | (2020.01) |
| G06V 20/56 | (2022.01) |
| G06F 18/214 | (2023.01) |

(52) U.S. Cl.
CPC ......... G05D 1/0088 (2013.01); G05D 1/0246 (2013.01); G06F 18/214 (2023.01); G06T 11/001 (2013.01); G06V 20/56 (2022.01)

(58) Field of Classification Search
CPC ............................ G05D 1/0246; G06T 11/001
USPC .......................................................... 382/104
See application file for complete search history.

(56) References Cited

U.S. PATENT DOCUMENTS

| | | | |
|---|---|---|---|
| 10,614,339 B2 | 4/2020 | Jiang | |
| 2015/0110398 A1* | 4/2015 | Totsuka | G06T 11/001 382/167 |
| 2018/0211130 A1* | 7/2018 | Jiang | G06V 10/764 |

FOREIGN PATENT DOCUMENTS

JP    2018-527660 A    9/2018

* cited by examiner

*Primary Examiner* — Ayodeji O Ayotunde
(74) *Attorney, Agent, or Firm* — Thomas | Horstemeyer, LLP

(57) ABSTRACT

An image processing apparatus applies predetermined image processing to an actual image captured by an image capturing device and recognizes a target within the captured image with use of the image which the predetermined image processing has been applied to. The image processing apparatus applies, to tones of the actual image, the predetermined image processing for reducing a difference from tones of a CG image which shows the same scene and which is presented through computer graphics.

13 Claims, 10 Drawing Sheets

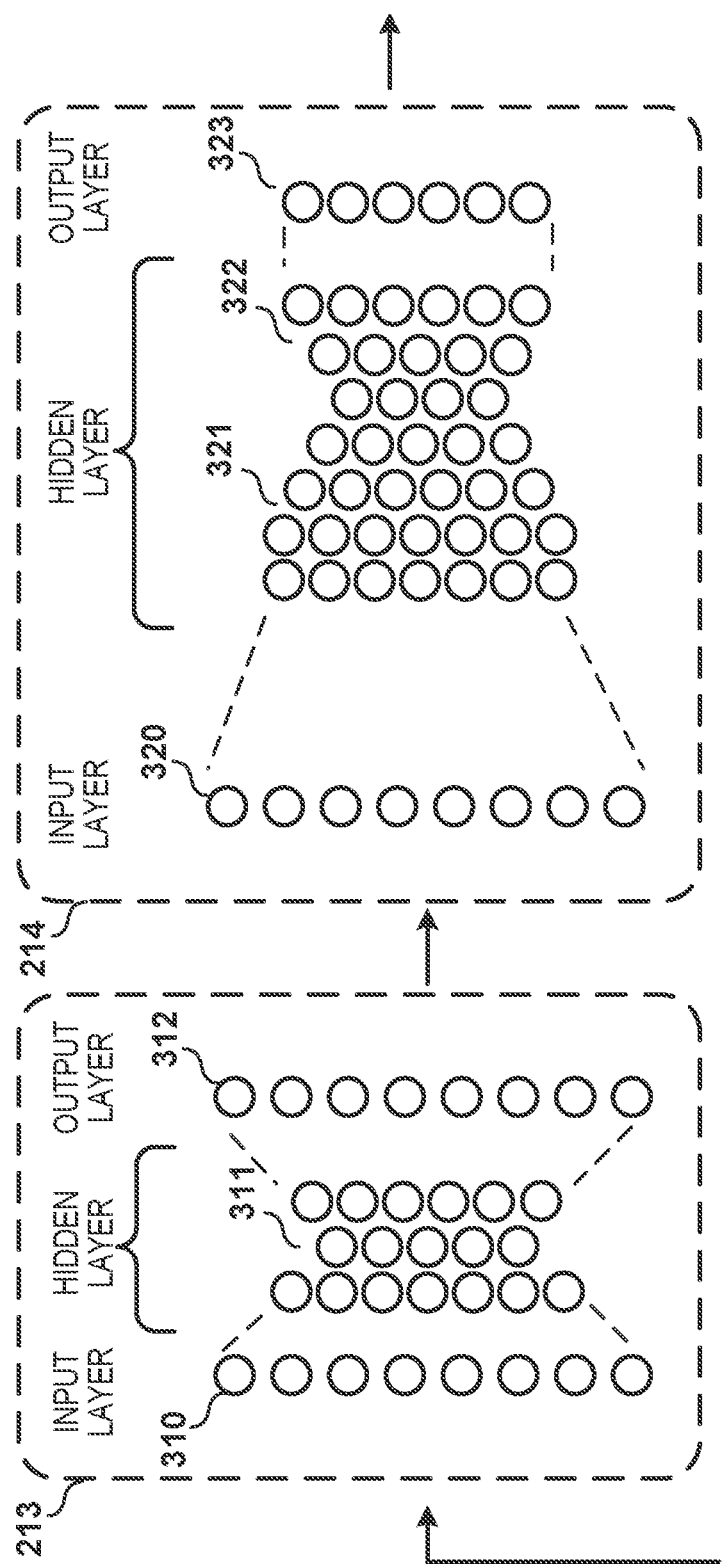
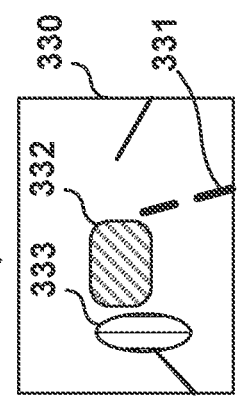
FIG. 3

FIG. 4

| THE OUTPUT (y) |
|---|
| OBJECT EXISTENCE OR ABSENCE (0,1) |
| CENTRAL POSITION OF OBJECT REGION (x) |
| CENTRAL POSITION OF OBJECT REGION (y) |
| WIDTH OF OBJECT REGION (w) |
| HEIGHT OF OBJECT REGION (h) |
| TYPE OF OBJECT 1 (PEDESTRIAN) |
| TYPE OF OBJECT 2 (VEHICLE) |
| TYPE OF OBJECT 3 (BILLBOARD) |
| TYPE OF OBJECT 4 (STREET) |
| TYPE OF OBJECT 5 (···) |
| ··· |
| TYPE OF OBJECT X (···) |
| ··· |
| OBJECT EXISTENCE OR ABSENCE (0,1) |
| OBJECT REGION (x) |
| OBJECT REGION (y) |
| ··· |

401 RECOGNITION RESULT OF GRID POSITION (0, 0)

RECOGNITION RESULT OF GRID POSITION (m, n)

IMAGE PROCESSING APPARATUS, VEHICLE, CONTROL METHOD FOR INFORMATION PROCESSING APPARATUS, STORAGE MEDIUM, INFORMATION PROCESSING SERVER, AND INFORMATION PROCESSING METHOD FOR RECOGNIZING A TARGET WITHIN A CAPTURED IMAGE

CROSS-REFERENCE TO RELATED APPLICATION(S)

This application claims priority to and the benefit of Japanese Patent Application No. 2020-005391 filed on Jan. 16, 2020, the entire disclosure of which is incorporated herein by reference.

BACKGROUND OF THE INVENTION

Field of the Invention

The present invention relates to an image processing apparatus, a vehicle, a control method for an information processing apparatus, a storage medium, an information processing server, and an information processing method for recognizing a target within a captured image.

Description of the Related Art

In recent years, a technique is known in which an image captured by a camera mounted on a vehicle is input to a neural network, and object recognition (also called object detection) is performed through estimation processing of the neural network (Japanese Patent Laid-Open No. 2018-527660).

Meanwhile, in a case where object recognition processing is performed using a captured image and the behaviors of a vehicle are controlled based on the result of such object recognition processing, it is demanded that a robust recognition result be achieved in various situations that can occur while the vehicle is traveling. On the other hand, as it is difficult to secure images that have captured all kinds of situations as learning data (also referred to as training data), there are cases where CG images that have been rendered using computer graphics (CG) are used as learning data.

An actually captured image (also referred to as an actual image) and a CG image have different image characteristics even if, for example, objects and backgrounds are similarly arranged in their scenes. Therefore, even if a learning model has been learned using learning data in which actual images and CG images are mixed, the recognition accuracy may not sufficiently increase during estimation processing that uses an actual captured image.

Japanese Patent Laid-Open No. 2018-527660 discloses the execution of monochromatic conversion and contrast adjustment as pre-processing for object recognition processing in order to achieve a more robust recognition result, but does not take into consideration the case where a CG image is used as learning data.

SUMMARY OF THE INVENTION

The present disclosure has been made in consideration of the aforementioned issues, and realizes a technique capable of increasing the robustness of estimation with respect to an actual image even when a CG image is used as learning data in image recognition processing on an apparatus.

In order to solve the aforementioned problems, one aspect of the present disclosure provides an image processing apparatus, comprising: one or more processors; and a memory storing instructions which, when the instructions are executed by the one or more processors, cause the image processing apparatus to function as: a processing unit configured to apply predetermined image processing to an actual image captured by an image capturing device; and a recognition unit configured to recognize a target within the captured image with use of the image which the predetermined image processing has been applied to, wherein the processing unit applies, to tones of the actual image, the predetermined image processing for reducing a difference from tones of a CG image which shows the same scene and which is presented through computer graphics.

Another aspect of the present disclosure provides, a vehicle provided with an image processing apparatus, the image processing apparatus comprising: one or more processors; and a memory storing instructions which, when the instructions are executed by the one or more processors, cause the image processing apparatus to function as: a processing unit configured to apply predetermined image processing to an actual image captured by an image capturing device; and a recognition unit configured to recognize a target within the captured image with use of the image which the predetermined image processing has been applied to, wherein the processing unit is configured to apply, to tones of the actual image, the predetermined image processing for reducing a difference from tones of a CG image which shows the same scene and which is presented through computer graphics.

Still another aspect of the present disclosure provides, a control method for an image processing apparatus, the control method comprising: applying predetermined image processing to an actual image captured by an image capturing device; and recognizing a target within the captured image with use of the image which the predetermined image processing has been applied to, wherein the applying applies, to tones of the actual image, the predetermined image processing for reducing a difference from tones of a CG image which shows the same scene and which is presented through computer graphics.

Still yet another aspect of the present disclosure provides, a non-transitory computer readable storage medium having recorded thereon a program for causing a computer to function as each unit of an image processing apparatus, the image processing apparatus comprising: a processing unit configured to apply predetermined image processing to an actual image captured by an image capturing device; and a recognition unit configured to recognize a target within the captured image with use of the image which the predetermined image processing has been applied to, wherein the processing unit applies, to tones of the actual image, the predetermined image processing for reducing a difference from tones of a CG image which shows the same scene and which is presented through computer graphics.

Yet still another aspect of the present disclosure provides, an information processing server, comprising: one or more processors; and a memory storing instructions which, when the instructions are executed by the one or more processors, cause the information processing server to function as: a processing unit configured to apply predetermined image processing to an actual image captured by an image capturing device; and a recognition unit configured to recognize a target within the captured image with use of the image which the predetermined image processing has been applied to, wherein the processing unit applies, to tones of the actual image, the predetermined image processing for reducing a difference from tones of a CG image which shows the same scene and which is presented through computer graphics.

Still yet another aspect of the present disclosure provides, an information processing method executed by an information processing server, the information processing method comprising: applying predetermined image processing to an actual image captured by an image capturing device; and recognizing a target within the captured image with use of the image which the predetermined image processing has been applied to, wherein the applying applies, to tones of the actual image, the predetermined image processing for reducing a difference from tones of a CG image which shows the same scene and which is presented through computer graphics.

According to the present invention, the robustness of estimation with respect to an actual image can be increased even when a CG image is used as learning data in image recognition processing on an apparatus.

BRIEF DESCRIPTION OF THE DRAWINGS

FIG. 3 is a diagram illustrating exemplary configurations of neural networks of a CG production processing unit and a model processing unit according to the first embodiment.

FIG. 4 is a diagram showing an example of an output of the model processing unit according to the first embodiment.

DESCRIPTION OF THE EMBODIMENTS

First Embodiment

Figure 1:
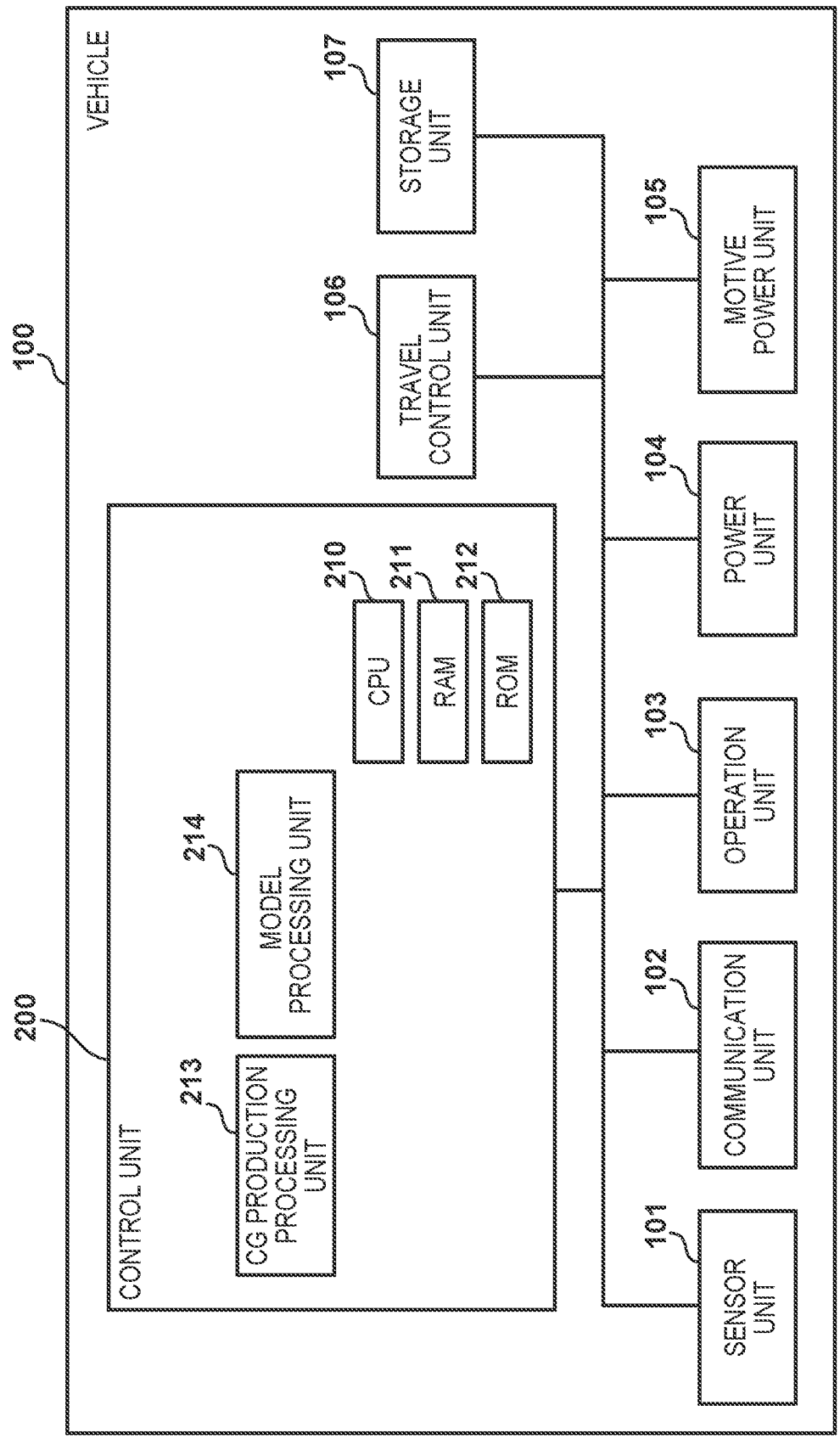
FIG. 1 is a block diagram showing an exemplary functional configuration of a vehicle according to a first embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Configuration of Vehicle>

First, an exemplary functional configuration of a vehicle 100 according to the present embodiment will be described with reference to FIG. 1. Note that respective functional blocks that will be described below with reference to the drawings may be integrated together or divided, and the described functions of each block may be realized by another block. Furthermore, what is described as hardware may be realized as software, and vice versa.

A sensor unit 101 includes a camera (an image capturing device) that outputs a captured image obtained by capturing the front (and further the rear direction and the surroundings) of the vehicle. The sensor unit 101 may further include Lidar (Light Detection and Ranging) that outputs a distance image obtained by measuring a distance in front of (and further in the rear direction and the surroundings of) the vehicle. The captured actual image is used in, for example, object recognition processing performed by a later-described control unit 200 and the like. Furthermore, various types of sensors that output the acceleration, position information, steering angle, and the like of the vehicle 100 may be included.

A communication unit 102 is, for example, a communication device including a communication circuit and the like, and communicates with an external server, a traffic system therearound, and the like via mobile communication that has been standardized as, for example, LTE, LTE-Advanced, and the like, or so-called 5G. A part or an entirety of map data can be received from an external server, and traffic information and the like can be received from another traffic system.

An operation unit 103 includes such operation members as buttons and a touchscreen installed inside the vehicle 100, and also includes such members as a steering wheel and a brake pedal that accept an input for driving the vehicle 100. A power unit 104 includes, for example, a battery composed of a lithium-ion battery and the like, and supplies electric power to respective components inside the vehicle 100. A motive power unit 105 includes, for example, an engine and a motor that generate motive power for causing the vehicle to travel.

Based on the result of object recognition output from the control unit 200, a travel control unit 106 controls traveling of the vehicle 100 so as to, for example, maintain traveling on the same lane or follow a vehicle ahead while traveling. Note that in the present embodiment, this travel control can be performed using a known method.

A storage unit 107 includes a nonvolatile, large-capacity storage device, such as a semiconductor memory. The storage unit 107 temporarily stores an actual image output from the sensor unit 101, as well as various types of sensor data output from the sensor unit 101. The storage unit 107 may also temporarily store, for example, learning data (also referred to as training data) which has been received from an external apparatus, such as an external server, via wired or wireless communication and which is used in learning of a model processing unit 214.

The control unit 200 includes, for example, a CPU 210, a RAM 211, and a ROM 212, and controls the operations of respective components of the vehicle 100. Furthermore, the control unit 200 obtains an actual image from the sensor unit 101 and executes object recognition processing. In the control unit 200, the CPU 210 deploys a computer program stored in the ROM 212 to the RAM 211 and executes the computer program; as a result, the functions of respective components included in the control unit 200, such as the model processing unit 214, are exerted.

The CPU 210 includes one or more processors. The RAM 211 is composed of, for example, a volatile storage medium, such as a DRAM, and functions as a working memory for the CPU 210. The ROM 212 is composed of a nonvolatile storage medium, and stores, for example, the computer program executed by the CPU 210 and setting values that are used in causing the control unit 200 to operate. Note that although the embodiments will be described hereinafter using an exemplary case where the CPU 210 executes processing of the model processing unit 214, processing of the model processing unit 214 may be executed by one or more other non-illustrated processors (e.g., a GPU).

A CG production processing unit 213 obtains an actual image output from the sensor unit 101 and images (an actual image and a CG image) included in learning data, and performs predetermined image processing (referred to as CG production processing) with respect to the obtained images. CG production processing will be described later.

The model processing unit 214 recognizes, for example, targets within an image by performing computation with a machine learning algorithm that uses, for example, deep learning (a deep neural network). The targets include, for example, pedestrians, vehicles, two-wheeled vehicles, billboards, signs, roads, and lines drawn in white or yellow on roads included within an image. Note that in the following description, targets may be simply referred to as, for example, objects.

The present embodiment will be described using an exemplary case where a neural network has a network structure called a CNN (Convolutional Neural Network) that includes, for example, one or more convolutional layers, pooling layers, and fully connected layers. However, the network structure is not limited to the CNN, and may adopt other configurations. Furthermore, the network structure may adopt a configuration that further includes skip connections, as with a ResNet (Residual Network). Alternatively, the network structure may further adopt a decoder configuration in addition to an encoder configuration with a CNN structure, as with an auto encoder, for example. It goes without saying that the network structure is not limited to the foregoing structures, and may be another structure as long as it is a neural network structure that is used for spatially distributed signals of, for example, images.

<Main Configuration for Controlling Traveling of Vehicle>

Figure 2:
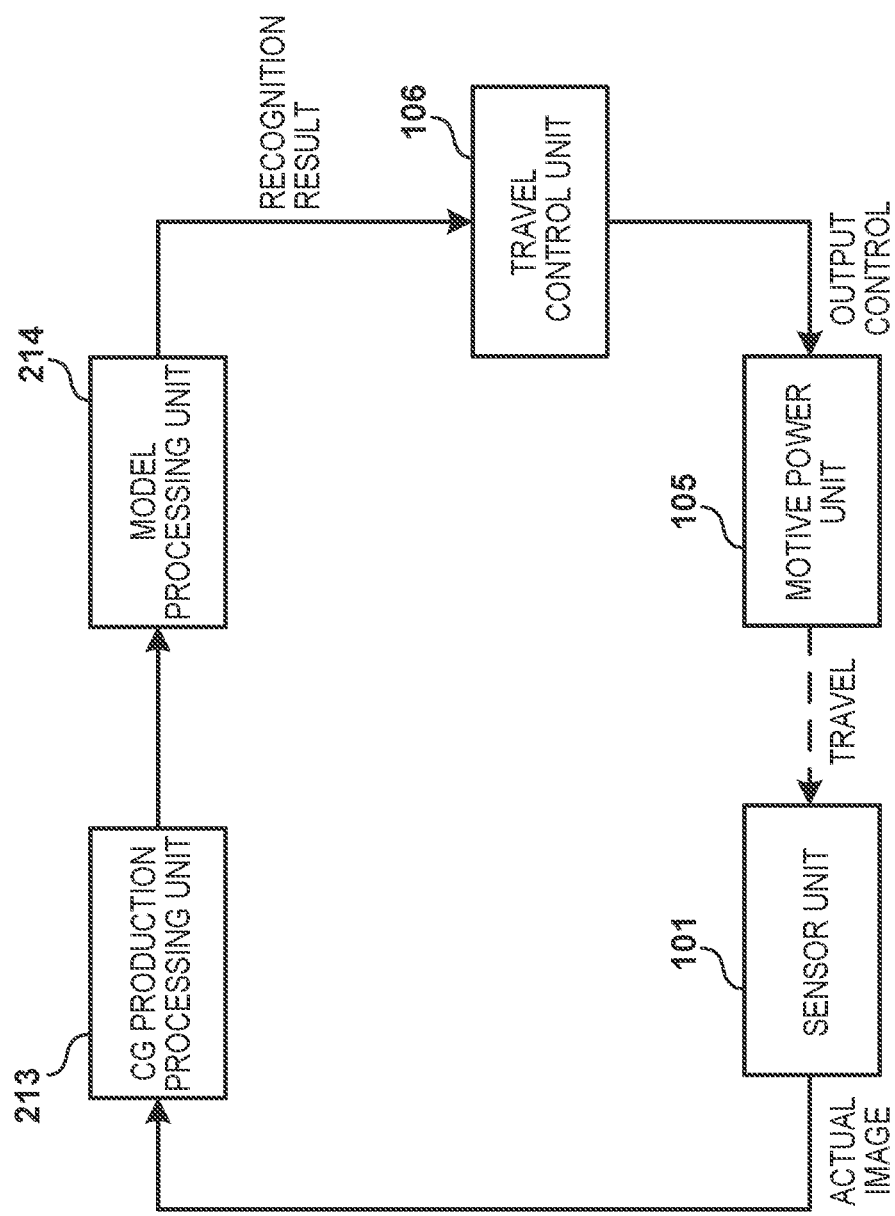
FIG. 2 is a diagram illustrating a main configuration for controlling traveling of the vehicle according to the first embodiment.

Next, a main configuration for controlling traveling of the vehicle 100 will be described with reference to FIG. 2. The sensor unit 101, for example, captures the front of the vehicle 100, and outputs a predetermined number of captured actual images per second. The CG production processing unit 213 of the control unit 200 applies later-described CG production processing to the actual images output from the sensor unit 101, and outputs images produced through CG to the model processing unit 214 of the control unit 200. The actual images that have passed through the CG production processing unit 213 are converted in terms of the characteristics of image signals so that they have characteristics similar to CG images.

The model processing unit 214 executes object recognition processing based on, for example, a neural network with use of the input CG-produced images, and outputs the recognition result to the travel control unit 106. Although the details of the recognition result will be described later, for example, information indicating whether there is an object, the position and size of the recognized object region, the type of the recognized object, and so forth is output for each of the grids obtained by dividing the input images.

The travel control unit 106 performs vehicle control for the vehicle 100 by, for example, outputting a control signal to the motive power unit 105 based on the result of object recognition and on various types of sensor information obtained from the sensor unit 101, such as the acceleration and steering angle of the vehicle. As vehicle control performed by the travel control unit 106 can be performed using a known method as stated earlier, the details thereof are omitted in the present embodiment. The motive power unit 105 controls generation of motive power in accordance with the control signal from the travel control unit 106.

<Exemplary Configurations of Neural Networks of CG Production Processing Unit and Model Processing Unit>

Next, a description is given of exemplary configurations of neural networks of the CG production processing unit and the model processing unit pertaining to object recognition processing with reference to FIG. 3. FIG. 3 schematically shows exemplary configurations of neural networks that are respectively implemented in the CG production processing unit 213 and the model processing unit 214.

The CG production processing unit 213 has a configuration of a neural network including a plurality of hidden layers, which is called a deep neural network, and mainly includes an input layer 310, hidden layers 311, and an output layer 312. For example, each pixel value of one captured actual image 330 is input to each neuron of the input layer 310.

The actual image 330 shown in FIG. 3 schematically depicts an actual image that has captured the front of the vehicle. The actual image 330 has captured a state of the existence of a line 331, which is located at the center of a road, and a first subject 332 (e.g., a vehicle) and a second subject 333 (e.g., a two-wheeled vehicle) ahead of the vehicle 100.

The input layer 310 includes, for example, neurons that correspond in number to the image size of the actual image×3 ch. Signals input from the input layer 310 are sequentially propagated from the input layer to the output layer, and the output layer 312 is configured to output an image that has been produced through CG (a CG-produced image). In the present embodiment, the output layer 312 outputs an image in the same size as the input layer; for example, the number of neurons in the output layer 312 is the same as that in the input layer.

The CG-produced image output from the output layer of the CG production processing unit 213 is input to an input layer 320 of the model processing unit 214. The number of neurons in the input layer 320 of the model processing unit 214 is the same as, for example, the number of neurons in the output layer 312 of the CG production processing unit 213.

The model processing unit 214 also has the configuration of a deep neural network. The configuration of hidden layers 321 may be, for example, the configuration of the CNN including convolutional layers, pooling layers, and fully connected layers as stated earlier.

An output layer 323 is composed of neurons that output data shown in FIG. 4 whereby the actual image is divided into a plurality of grids (e.g., 19×19) and each grid stores the recognition result. FIG. 4 shows an example in which the recognition result is output on a grid-by-grid basis as an exemplary output of the recognition results obtained through object recognition processing performed by the model processing unit 214.

A recognition result 401 is an exemplary output for storing a recognition result for, for example, a grid position (0, 0), that is to say, an upper-left grid. Whether there is an object (e.g., 1 is set when the object exists, and 0 is set when the object does not exist) and the central position and the size of an object region related to this grid are output. Furthermore, regarding object types, for example, when a pedestrian has been recognized, 1 is set as the value of an object type (pedestrian) whose existence has been recognized, and 0 is set as the values of other object types whose existence has not been identified. Output values of object types may be output as the probabilities at which respective objects exist.

<Sequence of Operations in Learning Stages Pertaining to CG Production Processing Unit and Model Processing Unit>

Figure 5:
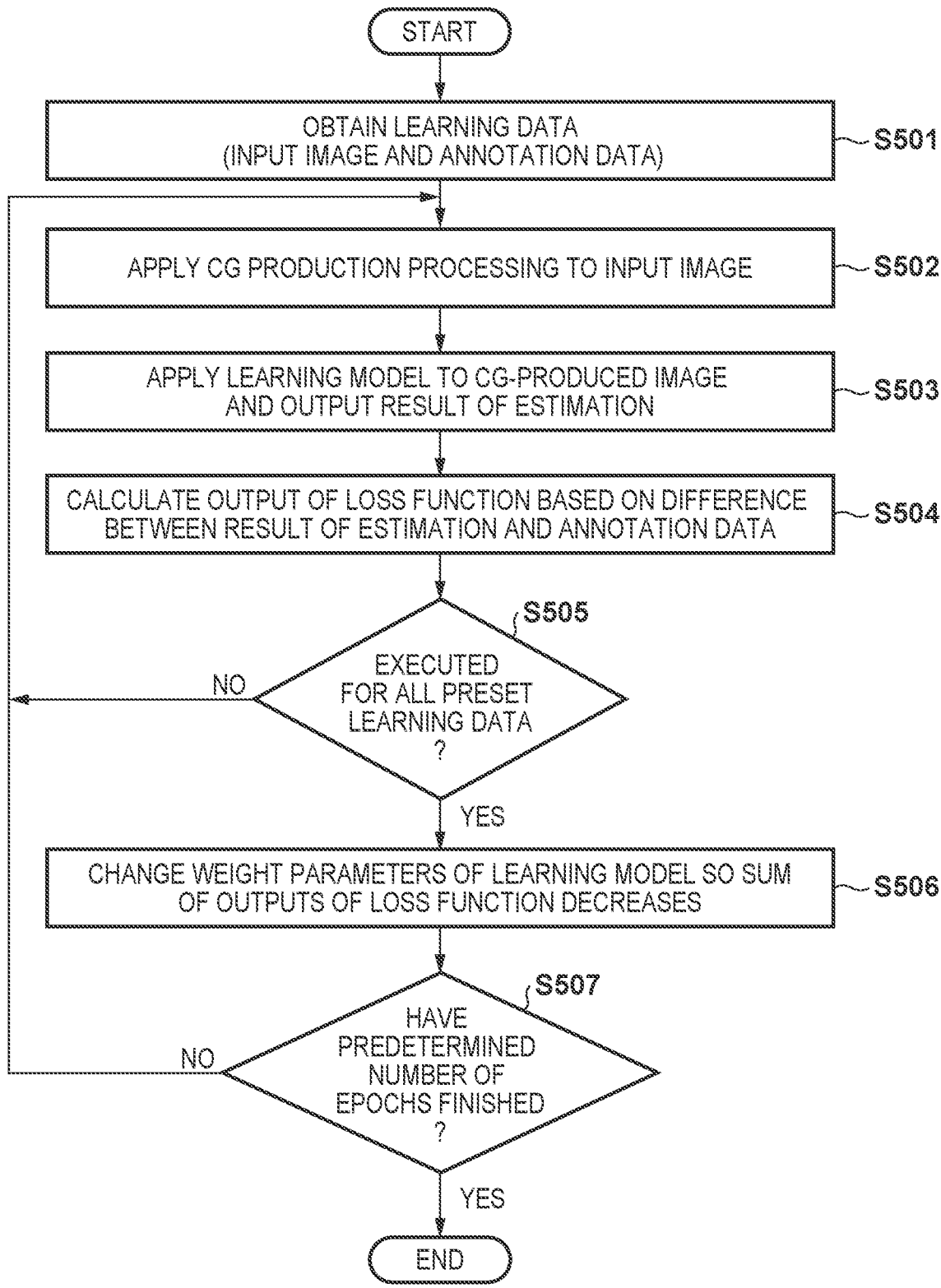
FIG. 5 is a flowchart showing a sequence of operations in learning stages of the CG production processing unit and the model processing unit according to the first embodiment.

Next, a description is given of a sequence of operations in learning stages of the CG production processing unit and the model processing unit with reference to FIG. 5. Note that the present processing is realized as the CPU 210 of the control unit 200 deploys the program stored in the ROM 212 to the RAM 211 and executes the program. It is also assumed that, during the present processing, the neural network of the CG production processing unit 213 is in a state where it has learned in advance (that is to say, weighting among neurons has been determined). On the other hand, the neural network of the model processing unit 214 has not learned yet, and the present processing will place it in a state where it has learned. In addition, it is assumed that learning data transferred from an external apparatus is temporarily stored in the storage unit 107 of the vehicle 100, and the control unit 200 uses predetermined learning data included in the stored learning data in learning of the present processing.

In step S501, the control unit 200 obtains learning data from the storage unit 107. Here, the learning data is data in which an actual image that has been actually captured from the vehicle and an annotation are set as a pair, or data in which a CG image and an annotation are set as a pair. An annotation is data describing whether there is an object and the position thereof within the actual image or the CG image, and indicates a ground truth that has been provided manually (or mechanically in some cases). The format of annotation data may be the same as that of the grid-by-grid recognition result illustrated in FIG. 4; for example, it is sufficient that annotation data describes whether there is an object, the central position of an object region, the size of the object region, and the type of the object (1 is appended to the relevant object type, and 0 is appended to other object types).

Figure 9:
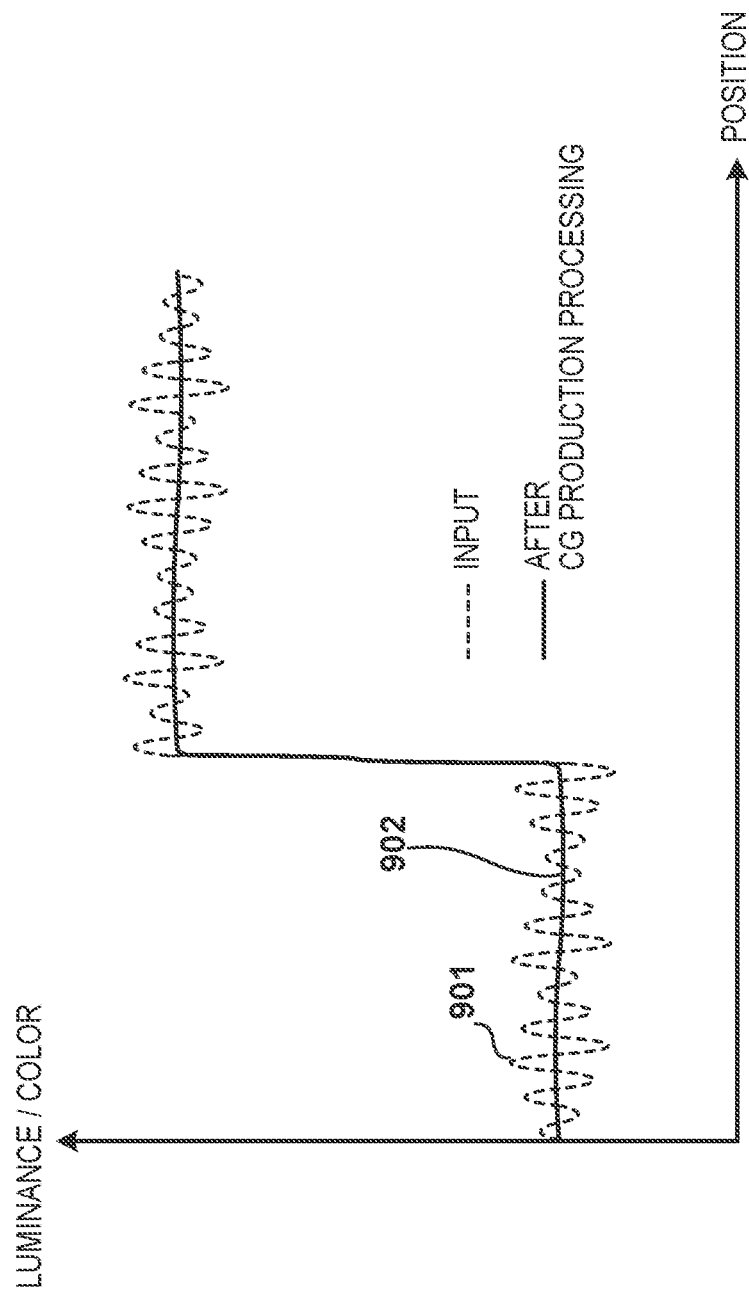
FIG. 9 is a diagram showing exemplary characteristics of an image signal output from the CG production processing unit according to the second embodiment.

In step S502, the CG production processing unit 213 applies CG production processing (based on the current neural network) to the input image in the learning data. In general, in a CG image, edge portions based on luminance or RGB values are intense, and regions other than the edge portions exhibit small noise and changes in shades compared to an actual image. Therefore, the CG production processing denotes processing for removing random noise so as to reduce the difference between tone characteristics of an actual image and tone characteristics of a CG image that shows the same scene while, for example, maintaining edge components in the image. For example, FIG. 9 schematically shows how an input signal changes when this CG production processing is applied. In the example shown in FIG. 9, a signal 901 represents a signal of an actual image that is input, and is in a state where there are high-frequency noise and changes in shades on both sides of an edge. On the other hand, a signal 902 represents characteristics after the CG production processing, and is in a state where an edge portion is maintained and regions other than the edge portion have small noise and changes in shades.

The CG production processing unit 213 has learned with use of learning data for CG production, which is a combination of an actual image, namely an input image, and ground truth data obtained by manually producing CG from this actual image, and the neural network is configured so as to configure a filter for converting input actual image data into a CG-produced image.

When the conversion characteristics of processing in the CG production processing unit 213 include characteristics that remove random noise while maintaining edge portions based on luminance or RGB values in actual image data, even if a CG image is input to the CG production processing unit 213, the CG image is hardly influenced. In this case, even if a CG image and an actual image are input to the CG production processing unit 213 without distinction from each other, the CG image is output substantially as is, and only the characteristics of the actual image are converted.

Note that when a CG image and an actual image included in learning data are input to the CG production processing unit 213 without distinction from each other in the application of the CG production processing, the CG production processing unit 213 may include a constituent that judges whether an input image is a CG image or an actual image (a CG image judgment unit). For example, the CG image judgment unit may be composed of a neural network that has learned to judge whether an input image is an actual image or a CG image. Then, the CG production processing unit 213 applies the CG production processing to an image that has been decided to be an actual image by the CG image judgment unit. On the other hand, an image that has not been decided to be an actual image by the CG image judgment unit may be input directly to the model processing unit 214 without the application of the processing thereto.

In this way, even when the CG production processing has characteristics that enhance edges of an input image so that the characteristics of not only an actual image but also a CG image are changed, an actual image and a CG image can be input to the CG production processing unit 213 without distinction from each other.

In step S503, the CG-produced image or the CG image is input to the model processing unit 214, and the model processing unit 214 outputs the result of estimation (i.e., the output shown in FIG. 4) performed by the neural network (that is currently learning). In step S504, the model processing unit 214 calculates an output of a loss function based on the difference between this result of estimation and the annotation included in the learning data. For example, using a loss function defined by the sum of squares of differences (predicted errors) between the results of estimation and annotations, the model processing unit 214 calculates an output of the loss function.

In step S505, the model processing unit 214 judges whether the outputs of the loss function have been calculated using all of preset data samples included in the learning data. When processing has been executed with respect to all of the preset data samples included in the learning data, the model processing unit 214 judges that processing of one epoch has finished, and processing proceeds to step S506; otherwise, processing returns to step S502.

In step S506, the model processing unit 214 changes the weights of a learning model so that the sum of the outputs of the loss function decreases. For example, the model processing unit 214 changes the weights among neurons, sequentially from the output layer to the input layer, based on the partial derivative value of the loss function with use of a known method called backpropagation.

In step S507, the model processing unit 214 judges whether processing of a predetermined number of epochs has finished. That is to say, whether processing of steps S502 to S506 has been repeated a preset number of times is judged. By repeating processing of steps S502 to S507, the weights of the neural network are changed so as to gradually converge on optimal values. When the model processing unit 214 judges that processing of the predetermined number of epochs has not finished, processing returns to step S502; otherwise, the present processing sequence is ended. In this way, upon completion of the sequence of operations in the learning stage of the model processing unit 214, the neural network of the model processing unit 214 is placed in a state where it has learned.

<Sequence of Operations in Learning Stage Pertaining to CG Production Processing Unit>

Figure 6:
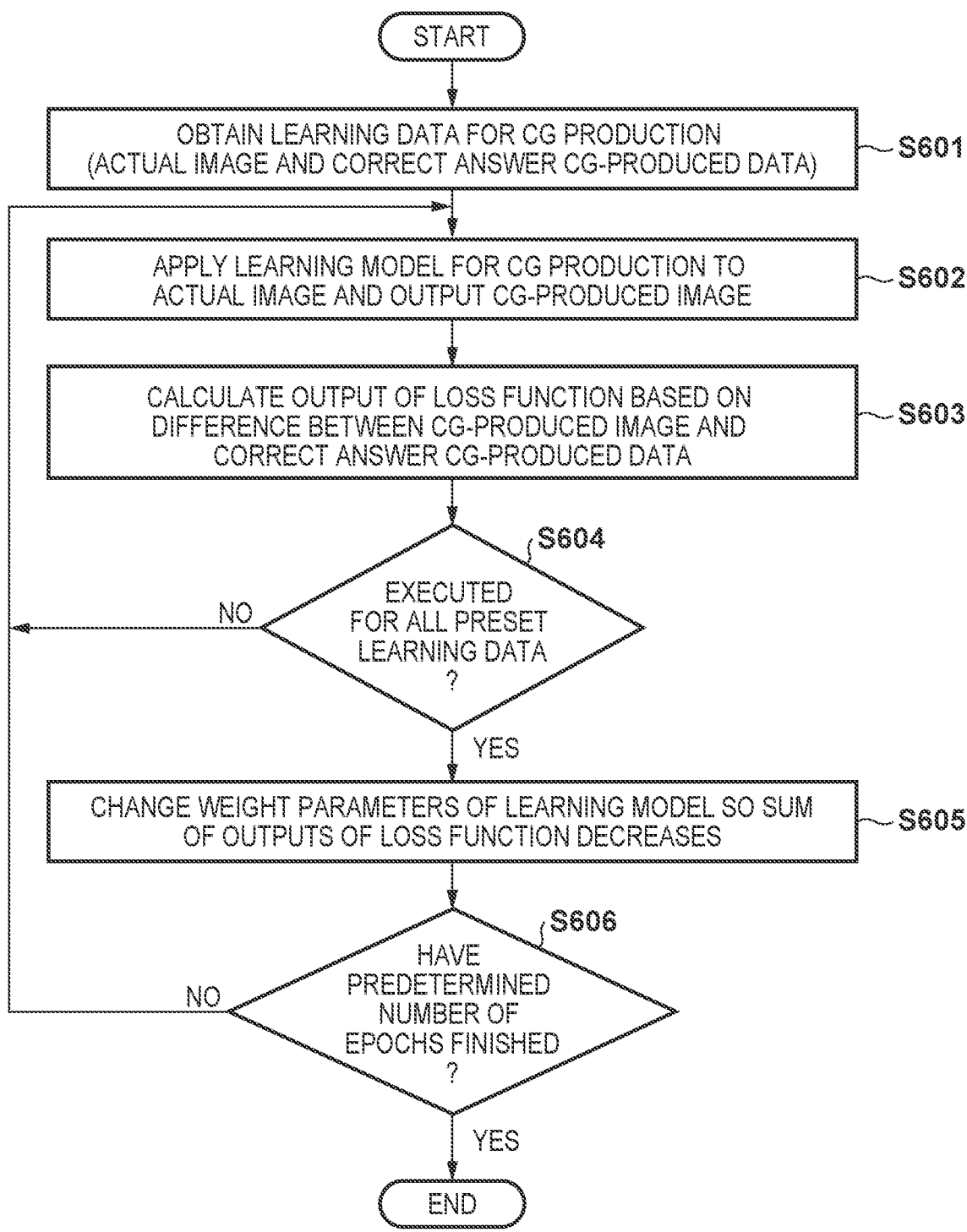
FIG. 6 is a flowchart showing a sequence of operations in the learning stage of the CG production processing unit according to the first embodiment.

Next, a description is given of a sequence of operations in the learning stage of the CG production processing unit 213 with reference to FIG. 6. Note that the present processing is realized as the CPU 200 of the control unit 200 deploys the program stored in the ROM 212 to the RAM 211 and executes the program. Also, during the present processing, the neural network of the CG production processing unit 213 has not learned, and the present processing will place it in a state where it has learned. In addition, it is assumed that learning data for CG production transferred from an external apparatus is temporarily stored in the storage unit 107 of the vehicle 100, and the control unit 200 uses predetermined learning data included in the stored learning data for CG production in learning of the present processing.

In step S601, the control unit 200 obtains learning data for CG production from the storage unit 107. Here, the learning data for CG production is a combination of an actual image and ground truth CG-produced data obtained by manually producing CG from this actual image.

In step S602, the CG production processing unit 213 applies the CG production processing (based on the current neural network) to the actual image in the learning data, and outputs a CG-produced image.

In step S603, the CG production processing unit 213 calculates an output of a loss function based on the difference between the CG-produced image and the ground truth CG-produced data included in the learning data. For example, using a loss function defined by the sum of squares of differences (predicted errors) between CG-produced images and pieces of correct CG-produced data, the CG production processing unit 213 calculates an output of the loss function.

In step S604, the CG production processing unit 213 judges whether the outputs of the loss function have been calculated using all of preset data samples included in the learning data. When processing has been executed with respect to all of the preset data samples included in the learning data, the CG production processing unit 213 judges that processing of one epoch has finished, and processing proceeds to step S605; otherwise, processing returns to step S602.

In step S605, the CG production processing unit 213 changes the weights of the learning model so that the sum of the outputs of the loss function decreases. For example, the CG production processing unit 213 changes the weights among neurons, sequentially from the output layer to the input layer, based on the partial derivative value of the loss function with use of a known method called backpropagation.

In step S606, the CG production processing unit 213 judges whether processing of a predetermined number of epochs has finished. That is to say, whether processing of steps S602 to S605 has been repeated a preset number of times is judged. By repeating processing of steps S602 to S606, the weights of the neural network are changed so as to gradually converge on optimal values. When the CG production processing unit 213 judges that processing of the predetermined number of epochs has not finished, processing returns to step S602; otherwise, the present processing sequence is ended. In this way, upon completion of the sequence of operations in the learning stage of the CG production processing unit 213, the neural network of the CG production processing unit 213 is placed in a state where it has learned.

<Sequence of Operations in Estimation Stage of Model Processing Unit 214>

Figure 7:
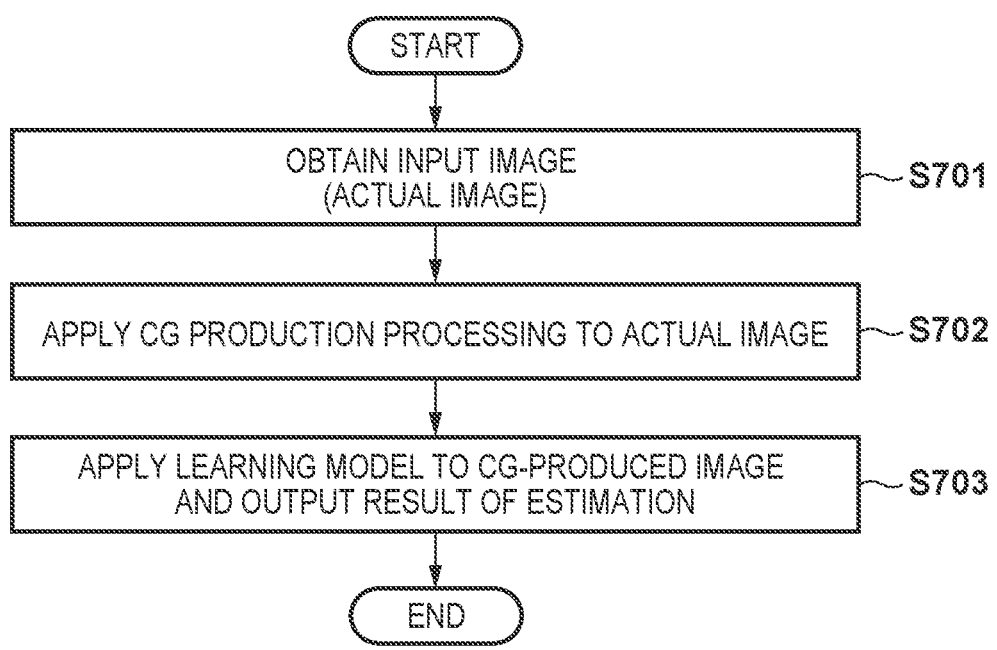
FIG. 7 is a flowchart showing a sequence of operations in estimation stages of the CG production processing unit and the model processing unit according to the first embodiment.

Next, a description is given of a sequence of operations in an estimation stage of the model processing unit 214 with reference to FIG. 7. The present processing is processing for estimating, for example, the type of a target object and the position of the object by performing object recognition processing with respect to an actual image that has been actually captured from the vehicle 100. Note that the present processing is realized as the CPU 200 of the control unit 200 deploys the program stored in the ROM 212 to the RAM 211 and executes the program. It is also assumed that, during the present processing, the neural network of the CG production processing unit 213 and the neural network of the model processing unit 214 are in a state where they have learned in advance (that is to say, weighting among neurons has been determined).

In step S701, the control unit 200 obtains an actual image output from the sensor unit 101. In step S702, the CG production processing unit 213 applies the above-described CG production processing to the actual image, and outputs an image that has been produced through CG.

In step S703, the model processing unit 214 executes processing for applying the learning model (neural network) that has learned to the image produced through CG and recognizing a target within the image, and outputs the result of estimation obtained through the processing (in the form shown in FIG. 4). When the estimation processing has finished, the control unit 200 ends the sequence of operations pertaining to the present processing.

As described above, according to the present embodiment, conversion processing as CG production processing is performed with respect to actual image data obtained by the vehicle, and then image recognition processing for recognizing a target within the image is performed with respect to the converted CG-produced image. As a result, an actual image in learning data during a learning stage and an actual image input during an estimation stage are both images that are approximate to a CG image in terms of characteristics, and the rate of erroneous learning and erroneous detection caused by the difference between a CG image and an actual image can be reduced. Therefore, in image recognition processing on an apparatus, even when a CG image is used as learning data, the robustness of estimation with respect to an actual image can be increased.

Second Embodiment

Next, a second embodiment of the present invention will be described. In the above-described embodiment, CG production processing is performed using the CG production processing unit 213 that is implemented using the neural network. In contrast, the present embodiment will be described using an example in which rule-based CG production processing is executed. Therefore, the present embodiment differs from the above-described first embodiment only in internal constituents of a CG production processing unit. Therefore, constituents that are substantially the same as those in the above-described embodiment are given the same reference numerals thereas, and a description thereof is omitted.

<Exemplary Configurations of Neural Networks of CG Production Processing Unit and Model Processing Unit>

Figure 8:
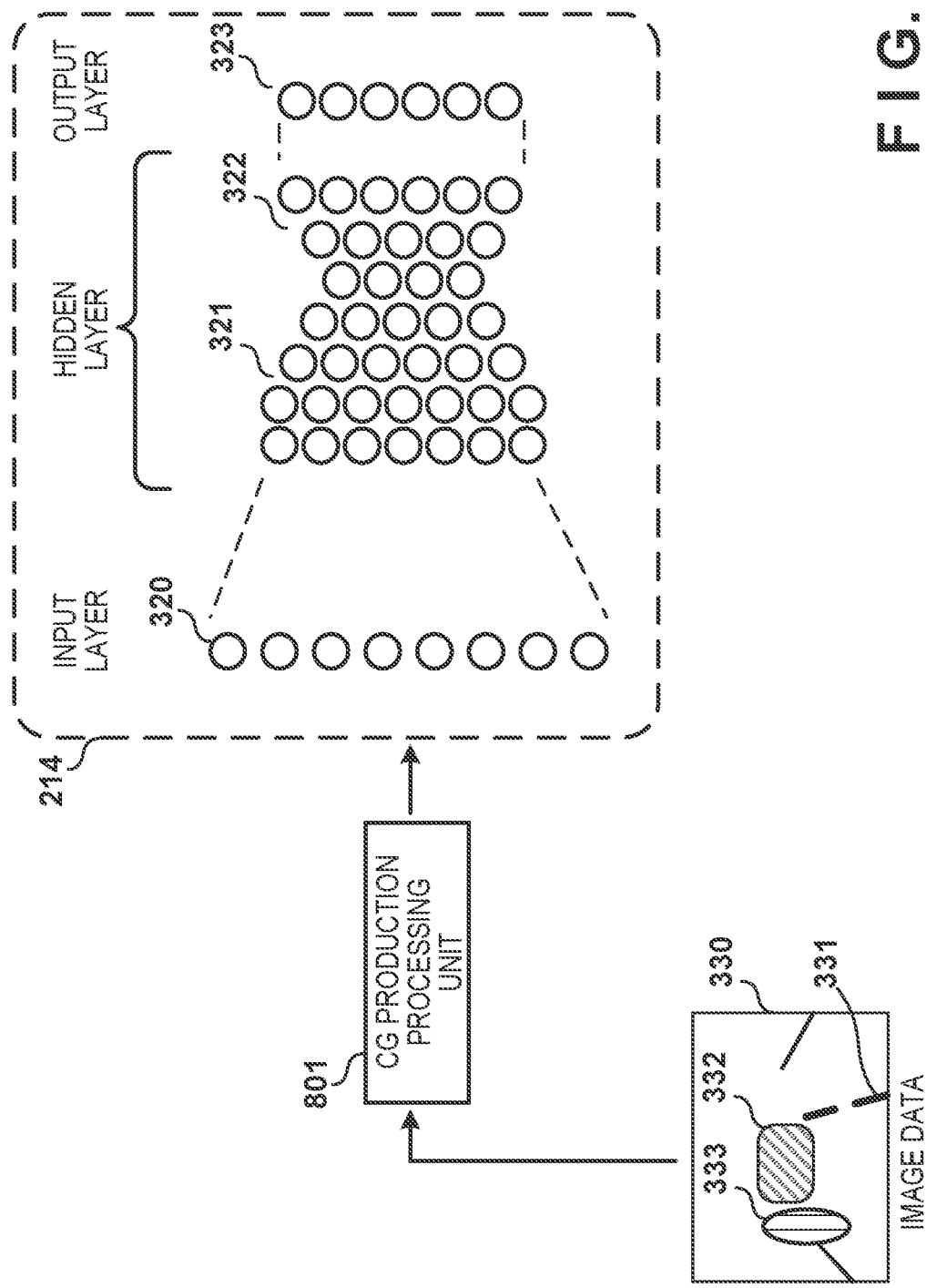
FIG. 8 is a diagram illustrating exemplary configurations of a CG production processing unit and a model processing unit according to a second embodiment.

A description is now given of exemplary configurations of a CG production processing unit and a model processing unit according to the present embodiment with reference to FIG. 8. Note that in FIG. 8, the model processing unit 214 is similar to that of the first embodiment, and thus the same constituents are shown with the same reference numerals thereas. Meanwhile, a CG production processing unit 801 is realized by rule-based processing.

The CG production processing unit 801 executes CG production processing with use of, for example, an ε filter. The epsilon filter performs the following filter processing with respect to, for example, all pixels (referred to as surrounding pixels $X_{(i,j)}$) included in a 5×5 pixel block region centered at a target pixel $X_t$ in an actual image. The following processing moves the target pixel sequentially, and is thus performed with respect to every target pixel in the actual image.

In the filter processing, first, the differences from the pixel value of the target pixel $X_t$ (tone differences $\Delta X_{(i,j)}$) are calculated with respect to the surrounding pixels $X_{(i,j)}$ within the pixel block. Among the pixels within the pixel block, the pixel values of pixels whose calculated differences have absolute values smaller than a predetermined threshold (ε value) ($X_{(i,j)}$ satisfying ($|\Delta X_{(i,j)}|<\varepsilon$)) are averaged, and the resultant value is used as a pixel value of the target pixel. That is to say, the pixel value of the target image is a value obtained by averaging Σ (applicable $X_{(i,j)}$) based on the applicable number of pixels. Therefore, with the ε filter, random noise can be removed while maintaining edge components in the actual image.

<Sequence of Operations Pertaining to Object Recognition Processing>

In the above-described configuration of the CG production processing unit 801, the control unit 200 can perform image recognition processing (steps S501 to S507) during a learning stage and image recognition processing (steps S701 to S703) in an estimation stage, which have been shown in FIG. 5 and FIG. 7, similarly to the first embodiment.

Note that as the CG production processing unit 801 of the present embodiment is not configured using a neural network, processing in a learning stage shown in FIG. 6 need not be performed.

As described above, according to the present embodiment, CG production processing that uses the ε filter is performed with respect to actual image data obtained by the vehicle, and then image recognition processing for recognizing a target within the image is performed with respect to the converted CG-produced image. As a result, an actual image in learning data in the case where the model processing unit 214 is in a learning stage and an actual image in the case where the model processing unit 214 is in an estimation stage are both images that are approximate to a CG image in terms of characteristics. Therefore, the rate of erroneous learning and erroneous detection caused by the difference between a CG image and an actual image can be reduced. Therefore, in image recognition processing on an apparatus, even when a CG image is used as learning data, the robustness of estimation with respect to an actual image can be increased.

Third Embodiment

The above-described embodiments have been described using an exemplary case where image recognition processing is executed on the vehicle 100. However, the present embodiment is not limited to a case where image recognition is executed on the vehicle, but is also applicable to a case where image recognition is executed on an information processing server. That is to say, the information processing server may receive an actual image obtained by the vehicle 100, execute image recognition processing with respect to the received actual image, and transmit the result of this recognition to the vehicle 100. The following describes an exemplary functional configuration of the information processing server according to such an embodiment.

<Configuration of Information Processing Server>

Figure 10:
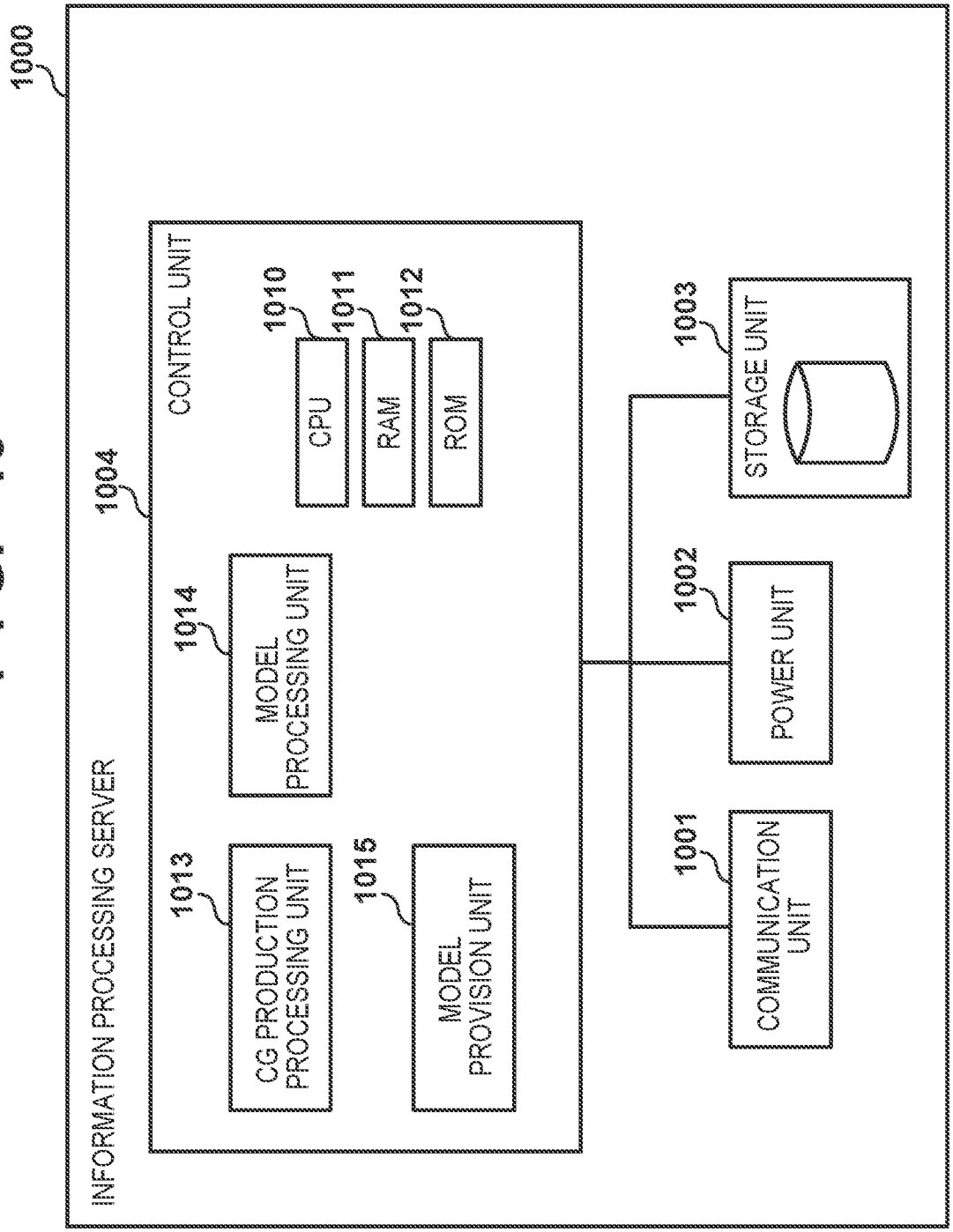
FIG. 10 is a block diagram showing an exemplary functional configuration of an information processing server according to a third embodiment.

Next, a description is given of an exemplary functional configuration of the information processing server with reference to FIG. 10. Note that respective functional blocks that will be described below with reference to the drawings may be integrated together or divided, and the described functions of each block may be realized by another block. Furthermore, what is described as hardware may be realized as software, and vice versa.

A control unit 1004 includes, for example, a CPU 1010, a RAM 1011, and a ROM 1012, and controls the operations of respective components of a data collection server 1000. In the control unit 1004, the CPU 1010 deploys a computer program stored in the ROM 1012 to the RAM 1011 and executes the computer program; as a result, the functions of respective components included in the control unit 1004 are exerted.

A CG production processing unit 1013 may be configured similarly to, for example, the CG production processing unit 213. That is to say, it has the configuration of a deep neural network and includes, for example, an input layer 310, hidden layers 311, and an output layer 312 that have been described with reference to FIG. 3. For example, processing similar to the learning stage that has been described above using FIG. 6 (steps S601 to S606) will place the neural network in a state where it has learned. Note that learning data for CG production may be stored in a storage unit 1003 in advance.

A model processing unit 1014 may be configured similarly to, for example, the model processing unit 214. That is to say, it has the configuration of a deep neural network and includes, for example, an input layer 320, hidden layers 321 and 322, and an output layer 323 that have been described with reference to FIG. 3. For example, processing similar to the learning stage that has been described above using FIG. 5 (steps S501 to S507) will place the neural network in a state where it has learned. Note that learning data may be stored in the storage unit 1003 in advance.

A communication unit 1001 is, for example, a communication device including a communication circuit and the like, and communicates with the vehicle 100 via, for example, a network, such as the Internet. The communication unit 1001 receives an actual image transmitted from the vehicle 100, and transmits the result of the above-described image recognition in the control unit 1004 to the vehicle 100. A power unit 1002 supplies electric power to respective components inside the data collection server 1000. The storage unit 1003 is a nonvolatile memory, such as a hard disk and a semiconductor memory. The storage unit 1003 stores information of the above-described learning data.

Furthermore, instead of performing image recognition processing on the server side, the information processing server 1000 may transmit to the vehicle 100 a model that has learned, and cause image recognition processing to be performed also inside the vehicle 100. In this case, the information processing server 1000 further includes a model provision unit 1015 for transmitting to the vehicle 100 information of the model that has learned.

The model provision unit 1015 provides the vehicle 100 with the model that has learned on the information processing server 1000 through processing similar to steps S501 to S507 and steps S601 to S606 so as to update the version of the model processing unit 214 of the vehicle 100. Information of this model that has learned includes, for example, version information of this learning model and weighting parameters of the neural network that has learned.

Compared to the vehicle, the information processing server can collect learning data (including CG images) in a wide variety of situations more easily, thereby enabling learning in accordance with a larger number of situations. Therefore, if the model that has learned using learning data collected in the server can be provided to the vehicle 100, the robustness of estimation with respect to images on the vehicle can be increased.

Other Embodiments

Note that the above embodiments have been described using an exemplary case where the control unit 200 or the control unit 1004 has learned with use of a CG image and an actual image, and then object recognition processing is executed using the actual image. However, the above-described embodiments are also applicable to a case where other processing pertaining to image recognition processing is implemented. That is to say, the present embodiments are also applicable to, for example, image-based recognition processing, such as travel road recognition, scene acknowledgement, and prediction of behaviors of traffic participants. For example, the model processing unit 1014 may perform the aforementioned processing for scene acknowledgement.

Furthermore, a region of a specific target may be recognized using a learning model for object recognition that has learned in advance with use of a CG image and an actual image, and processing performed by the CG production processing unit 1013 may vary depending on the type of the recognized target. For example, with respect to a vehicle or a target that exists on a road, the c value of the c filter may be increased compared to other regions, or edge enhancement processing may be added. Alternatively, CG production processing may be performed when a specific type of target has been recognized.

Summary of Embodiments

1. An image processing apparatus (e.g., an image processing apparatus included in the vehicle 100) according to the above-described embodiments includes: one or more processors; and a memory storing instructions which, when the instructions are executed by the one or more processors, cause the image processing apparatus to function as: a processing unit (e.g., 213) configured to apply predetermined image processing to an actual image captured by an image capturing device; and a recognition unit (e.g., 214) configured to recognize a target within the captured image with use of the image which the predetermined image processing has been applied to, wherein the processing unit applies, to tones of the actual image, the predetermined image processing for reducing a difference from tones of a CG image which shows the same scene and which is presented through computer graphics.

According to this embodiment, in image recognition processing on an apparatus, even when a CG image is used as learning data, the robustness of estimation with respect to an actual image can be increased.

2. In the foregoing embodiment, the recognition unit includes a first learning model (e.g., 320, 321, 322, 323), and learning data that is used for training the first learning model includes the actual image and the CG image.

According to this embodiment, learning data that is difficult to collect using the actual image can be supplemented with the use of the CG image.

3. In the foregoing embodiment, the processing unit is further capable of applying the predetermined image processing to the learning data, and when the processing unit decides that an image in which the predetermined image processing is intended to be applied to is the CG image, the processing unit does not apply the predetermined image processing to the image.

According to this embodiment, when the learning data is used, the predetermined image processing can be applied only to the actual image.

4. In the foregoing embodiment, the recognition unit further recognizes a target within the CG image with use of the CG image to which the predetermined image processing has not been applied.

According to this embodiment, when the learning data is used, recognition processing that uses the CG image can be executed.

5. In the foregoing embodiment, the processing unit applies the predetermined image processing with characteristics that remove random noise while maintaining edge components of the image (e.g., step S502).

According to this embodiment, the actual image can be converted into an image that is similar to CG.

6. In the foregoing embodiment, the processing unit applies the predetermined image processing with use of a c filter (e.g., step S502).

According to this embodiment, CG production processing can be performed using the c filter.

7. In the foregoing embodiment, the processing unit is configured to apply the predetermined image processing based on a second learning model, and the second learning model performs learning with use of a combination of the actual image and ground truth data as learning data, and the ground truth data is a CG data generated from the actual image.

According to this embodiment, CG production processing can be performed using the learning model.

8. In the foregoing embodiment, when a specific target exists in the actual image, the processing unit makes the predetermined image processing vary between a region of the specific target and another region.

According to this embodiment, the specific target can be processed in a more robust manner.

The invention is not limited to the foregoing embodiments, and various variations/changes are possible within the spirit of the invention.

What is claimed is:
1. An image processing apparatus, comprising:
one or more processors; and a memory storing instructions which, when the instructions are executed by the one or more processors, cause the image processing apparatus to:

apply predetermined image processing to an actual image captured by an image capturing device, thereby generating a computer graphics (CG) image from the actual image; and recognize a target within the captured image based on the CG image;

wherein the predefined image removes random noise to reduce a difference between a tone characteristic of the actual image and a tone characteristic of the CGimage.

2. The image processing apparatus according to claim 1, wherein the recognizing of the target within the captured image based on the CG image is performed using a first learning model, and learning data that is used for training the first learning model includes the actual image and the CG image.

3. The image processing apparatus according to claim 2, wherein the instructions which, when the instructions are executed by the one or more processors, further cause the image processing apparatus to:

apply the predetermined image processing to the learning data, and when it is determined that an image in which the predetermined image processing is intended to be applied to is the CG image, the predetermined image processing is not applied to the image.

4. The image processing apparatus according to claim 3, wherein the target is recognized within the CG image with use of the CG image to which the predetermined image processing has not been applied.

5. The image processing apparatus according to claim 1, wherein the predetermined image processing is applied with characteristics that remove the random noise while maintaining edge components of the image.

6. The image processing apparatus according to claim 1, wherein the predetermined image processing is applied with use of an ε filter.

7. The image processing apparatus according to claim 1, wherein the predetermined image processing is applied based on a second learning model, and the second learning model performing learning with use of a combination of the actual image and ground truth data as learning data, and the ground truth data is a CG data generated from the actual image.

8. The image processing apparatus according to claim 1, wherein when a specific target exists in the actual image, the predetermined image processing is varied between a region of the specific target and another region.

9. A vehicle provided with an image processing apparatus, the image processing apparatus comprising:

one or more processors; and a memory storing instructions which, when the instructions are executed by the one or more processors, cause the image processing apparatus to:

apply predetermined image processing to an actual image captured by an image capturing device, thereby generating a computer graphics (CG) image from the actual image; and recognize a target within the captured image based on the CG image;

wherein the predetermined image processing removes random noise to reduce a difference between a tone characteristic of the actual image and a tone characteristic of the CGimage.

10. A control method for an image processing apparatus, the control method comprising:

applying predetermined image processing to an actual image captured by an image capturing device, thereby generating a computer graphics (CG) image from the actual image; and recognizing a target within the captured image based on the CG image;

wherein the predetermined image processing removes random noise to reduce a difference between a tone characteristic of the actual image and a tone characteristic of the CGimage.

11. A non-transitory computer readable storage medium having recorded thereon a program for causing a computer to:

apply predetermined image processing to an actual image captured by an image capturing device, thereby generating a computer graphics (CG) image from the actual image; and recognize a target within the captured image based on the CG image;

wherein the predetermined image processing removes random noise to reduce a difference between a tone characteristic of the actual image and a tone characteristic of the CGimage.

12. An information processing server, comprising:

one or more processors; and a memory storing instructions which, when the instructions are executed by the one or more processors, cause the information processing server to:

apply predetermined image processing to an actual image captured by an image capturing device, thereby generating a computer graphics (CG) image from the actual image; and recognize a target within the captured image based on the CG image;

wherein the predetermined image processing removes random noise to reduce a difference between a tone characteristic of the actual image and a tone characteristic of the CGimage.

13. An information processing method executed by an information processing server, the information processing method comprising:

applying predetermined image processing to an actual image captured by an image capturing device, thereby generating a computer graphics (CG) image from the actual image; and recognizing a target within the captured image based on the CG image;

wherein the predetermined image processing removes random noise to reduce a difference between a tone characteristic of the actual image and a tone characteristic of the CGimage.

* * * * *